United States Patent
Vazvan et al.

(10) Patent No.: US 6,400,946 B1
(45) Date of Patent: Jun. 4, 2002

(54) MULTIMODE UNIVERSAL MOBILE TELECOMMUNICATIONS SYSTEM

(75) Inventors: Behruz Vazvan, Espoo (FI); Janne Jormalainen, Irving, TX (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/913,390

(22) PCT Filed: Mar. 8, 1996

(86) PCT No.: PCT/FI96/00141
§ 371 (c)(1),
(2), (4) Date: Feb. 11, 1998

(87) PCT Pub. No.: WO96/28947
PCT Pub. Date: Sep. 19, 1996

(30) Foreign Application Priority Data

Mar. 13, 1995 (FI) .................................................. 951181

(51) Int. Cl.$^7$ ................................................ H04Q 7/20
(52) U.S. Cl. ...................................................... 455/432
(58) Field of Search ................................ 455/435, 552, 455/437, 444, 427, 406, 432, 430, 414, 434, 433, 405

(56) References Cited

U.S. PATENT DOCUMENTS

| | | | | |
|---|---|---|---|---|
| 4,829,554 A | * | 5/1989 | Barnes et al. ................ | 455/432 |
| 5,175,758 A | | 12/1992 | Levanto et al. ................ | 379/57 |
| 5,260,943 A | | 11/1993 | Comroe et al. ............... | 370/95.1 |
| 5,303,297 A | * | 4/1994 | Hillis .......................... | 455/406 |
| 5,345,448 A | | 9/1994 | Keskitalo .................... | 370/95.3 |
| 5,355,517 A | | 10/1994 | Olson ......................... | 455/34.1 |
| 5,410,733 A | | 4/1995 | Niva et al. ................... | 455/33.2 |
| 5,448,623 A | * | 9/1995 | Wiedeman et al. .......... | 455/430 |
| 5,483,668 A | | 1/1996 | Malkamaki et al. ......... | 455/33.2 |
| 5,524,009 A | | 6/1996 | Tuutijarvi et al. ........... | 370/95.3 |
| 5,574,775 A | * | 11/1996 | Miller, II et al. ............. | 455/444 |
| 5,613,213 A | * | 3/1997 | Naddel et al. ............... | 455/414 |
| 5,732,359 A | * | 3/1998 | Baranowsky, II et al. .. | 455/552 |
| 5,784,695 A | * | 7/1998 | Upton et al. ................. | 455/427 |
| 5,915,214 A | * | 6/1999 | Reece et al. ................. | 455/552 |
| 6,047,180 A | * | 4/2000 | Coutant ....................... | 455/434 |
| 6,101,387 A | * | 8/2000 | Granberg et al. ............ | 455/433 |
| 6,201,957 B1 | * | 3/2001 | Son et al. .................... | 455/406 |
| 6,246,870 B1 | * | 6/2001 | Dent et al. ................... | 455/405 |

FOREIGN PATENT DOCUMENTS

GB  2 266 030  10/1993

OTHER PUBLICATIONS

Electronic Industries Association, "Cellular Radiotelecommunications Intersystem Operations: Intersystem Handoff", IS41.2 (Revision B).*

* cited by examiner

Primary Examiner—William D. Cumming
Assistant Examiner—Myron K. Wyche
(74) Attorney, Agent, or Firm—Perman & Green, LLP (57) ABSTRACT

The invention relates to a mobile communication entity, which combines several mobile communication networks, which can be part of different mobile communication systems (31, 33, 34, 44), and in which a mobile terminal can operate and establish connections to a receiver via said mobile communication networks. The mobile terminal selects a first mobile communication network based on a certain criterion or criteria, and establishes a first connection to the receiver using the first mobile communication network. After that the mobile terminal selects a second mobile communication network based on a certain criterion or criteria and establishes a second connection to the receiver. After the second connection has been successfully established, the mobile terminal disconnects the first connection.

16 Claims, 4 Drawing Sheets

MULTIMODE UNIVERSAL MOBILE TELECOMMUNICATIONS SYSTEM

BACKGROUND OF THE INVENTION

The invention relates to a multimode universal mobile telecommunications system, and particularly it relates to a system in which satellite and/or terrestrial mobile communication systems are integrated and in which a subscriber may choose between systems, services and connections on the basis of the price, quality, capacity or other criteria. In this description we will also use shorter names for the different mobile communication systems mentioned above, which will be, respectively, universal multimode system, satellite system and terrestrial system.

All recent studies carried out by various consortia formed for the purpose of providing satellite-based mobile communication services have concluded that a wide area with relatively few service users is a basic criterion for changing into satellite systems. System interworking has also been examined as co-operation between one satellite system and one terrestrial system only, by developing dual-mode terminals which operate only between two systems. In addition, the co-operation of two systems at the dual-mode terminal level is designed such that two subscriber numbers are needed.

SUMMARY OF THE INVENTION

The rapid growth of mobile communications especially in business environment and, on the other hand, the need of local users to have access to various satellite and terrestrial systems have set new challenges for the communications field. In the present invention, the key factors in the system interworking are global availability and cost-effectiveness. Therefore, the invention implements universal integration of various satellite-based and terrestrial systems at the radio interface level. Problems concerning the mutual co-operation and interconnections of the various mobile communication systems can be solved at two levels: at the network level and at the mobile terminal level. To modify existing mobile communication networks would be a very expensive solution. On the other hand, many of the problems involved in the integration of different systems can be transferred to the mobile terminal level. In the invention, it is developed a new communication system concept by integrating various satellite and terrestrial systems at the mobile terminal level by making use of a multiple access satellite communication system (MASCS). Such a system provides a transparent subscriber market (TSM) in which several networks may share subscribers, whereby the networks will have more customers without having to fear an overload. This means a significant growth in capacity, which is cost-effective from the point of view of the operators and brings new efficiency in the use of capacity in mobile communications. A universal multimode system eliminates the need to radically change existing mobile communication networks.

The invention may be implemented as an initial step toward rational liberalization of telecommunication services, which may also bring about new standards in the world of communications. From the user's point of view a multimode system forms a multiple access network (MAN) which includes various satellite-based and terrestrial mobile communication networks and also takes into account the universal mobile telecommunications system (UMTS) and the future public land mobile telecommunication systems (FPLMTS) as possible future entities in the network architecture of the universal multimode system. The advanced solutions, techniques and benefits of the universal multimode system provide the best possible service for the end user and bring rational free competition to the world of telecommunications. Such a system should be implemented before the various satellite systems start to build their networks which indeed are not always economical or user-friendly; nor will their competition with terrestrial mobile communication networks benefit the users or terrestrial mobile communication operators. The universal multimode system realizes the main objectives of global telecommunication; free competition, open accessibility and universal services as well as consideration of local regulations.

The invention relates to a universal multimode mobile communication system which in its embodiment may include:

- multimode and dual-mode terminals used by the multimode system to provide the users of these equipment access to two or more satellite-based or terrestrial mobile communication systems,
- a selective multiple access system, which includes a price-quality selection system and provides the mobile terminal with information needed to select the optimal network,
- price-quality selection procedures for selecting access or handover between or inside two or more satellite or terrestrial networks,
- a mobile pricing system including a flexible cell- or network-based pricing system, providing information about service quality and prices for the mobile terminal,
- a mobile invoicing system including a smart card management part and a call charging module and a subscriber identity and invoicing module in a mobile terminal and a price information controller and a dynamic accounting system,
- a multiple access practice,
- a multiple access satellite communication system which provides not only communication services but also methods, services and information listed above, needed in the operation of a dual-mode or multimode terminal, and which also may provide the service prices of all other satellite or terrestrial operators,
- a backward relay system to connect and change channels from a cell or beam to another to form virtually fixed cells, and
- location registration and call procedures.

It is characteristic of a universal multimode system which connects or links together various terrestrial and satellite-based mobile communication networks that, on one hand, it is an intermediate system between their radio interfaces, ie. an integrated telecommunication protocol, and, on the other hand, that it is a communication system which connects all satellite and terrestrial communication systems to its own multiple access satellite communication system (MASCS). A universal multimode system that provides intelligent methods for dual-mode and multimode mobile terminals creates an entirely new mobility concept. Such terminals include a price-quality function which enables the optimal use of the connections of various mobile communication networks. The price-quality (PQ) selection measures and estimates both the transmission quality and the cost-effectiveness of the service provided by the various networks or just one satellite network and selects on the basis of these parameters the optimal connection (channel) and requests the network to allocate it. The PQ selectivity serves as an access and handover system called PQ-selective access and handover and it gives the mobile terminal full freedom to decide which network's radio channel to choose. This access and handover method is a new solution giving the mobile terminal access to various networks and eliminating the delay effects of satellite signals. The PQ selection can also be applied to other types of dual-mode or multi-mode mobile stations or fixed terminals. All above-mentioned solutions related to the present invention are new applications of terrestrial and satellite communications and they are very valuable both technologically and commercially.

In order to make mutual co-operation between various mobile communication networks possible, it is imperative to develop solutions for such problems as handover between satellite networks and terrestrial networks and user access to these systems. In addition, a number of smaller problems have to be solved. Handover between a cell in a cellular system and a satellite beam is considered problematic. In the GSM, for example, it is considered problematic because inside a satellite beam there may be two cells with the same broadcast channel (BCCH) and base station identification. In addition, the propagation delay of satellite signals (depending on the positions of different satellites) and the handover from a satellite to the GSM produce overlapping signals, which results in difficulties in the decision-making concerning handover. Therefore, in the universal multimode system, these solutions are integrated in the multimode and dual-mode terminals, which reduces the need for major modifications in the existing systems.

Considering that future cellular mobile networks, integrated into a universal mobile telecommunication system or into a future public land mobile telecommunication system or separate, as today, will be competitors or partners to satellite communication systems, the satellite systems should be able to co-operate with the terrestrial networks so that they can encourage both users and, on the other hand, terrestrial operators to advance integration steadily but effectively. This requires developed solutions for the needs of the users. Since satellite networks have coverage areas covering the terrestrial networks, a dual-mode or multimode terminal should be able to compare both the transmission quality and the price competitiveness of the services provided by these networks. The operation of a dual-mode terminal is restricted between one terrestrial system and one satellite system, but a multimode terminal can access several terrestrial and satellite systems. The PQ selection function provides a mobile terminal with the possibility of using satellite systems or cellular systems on the basis of quality and price competitiveness parameters. Such a terminal will, however, resort to satellite resources if all channels are busy or they operate in areas where there are no terrestrial mobile services available.

BRIEF DESCRIPTION OF THE DRAWING

The invention and its embodiments are described in greater detail with reference to the attached drawing where.

DETAILED DESCRIPTION OF THE INVENTION

Figure 4:
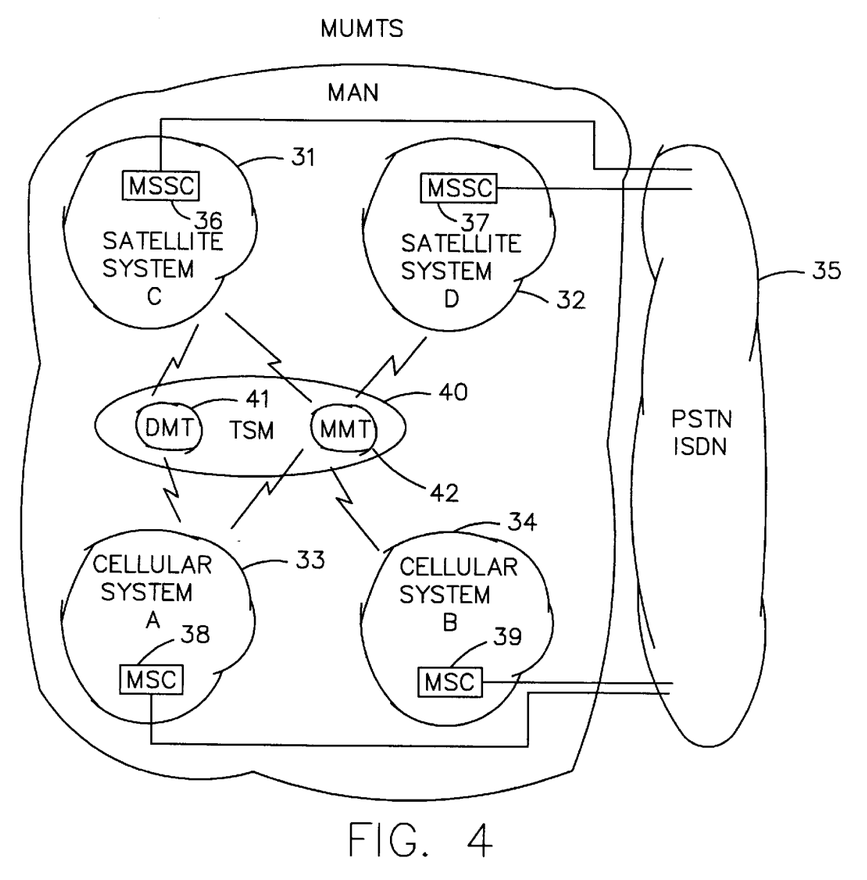
FIGS. 4, 5 illustrate embodiments of the universal multimode mobile communication system according to the invention.
Figure 5:
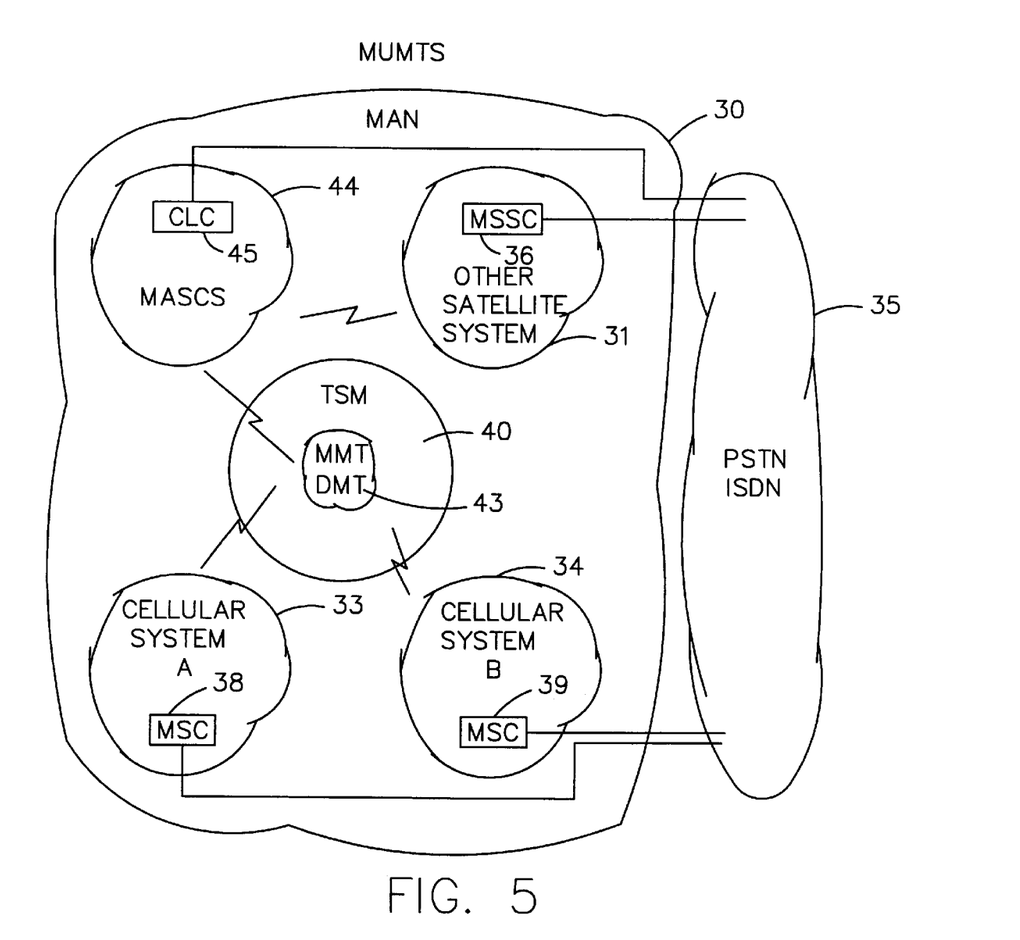

FIGS. 4 and 5 illustrate the universal multimode system according to the invention. Same or corresponding parts in FIGS. 4 and 5 have the same reference numbers. FIG. 4 shows a universal multiple access system, in which a multiple access network 30 comprises two cellular systems A and B, 33 and 34 respectively, and two satellite systems C and D, 31 and 32 respectively. The satellite systems are connected to the fixed telephone network 35 respectively via exchanges 36 and 37, and the cellular systems 30 and 34 likewise respectively via exchanges 38 and 39. The multiple access network creates at the dual-mode terminal 41 or multimode terminal 42 a transparent subscriber market 40.

FIG. 5 shows a preferable embodiment of the universal multiple access system in which all satellite and terrestrial networks are linked to the multiple access satellite communication system 44. In this system the exchange is replaced by a calls local controller 45. The multiple access satellite communication system 44 serves as an interconnecting system for the other satellite systems represented in FIG. 5 by block 31. In the arrangement of FIG. 5, the multimode terminals 43 are connected only to cellular systems 33 and 34 and to the multiple access satellite communication system 44.

Next, we will discuss the access procedure. In the GSM, the access procedure comprises a request from the mobile station and an answer from the base station which will allocate the channel. A mobile station in the idle mode needs a lot of information to be able to operate efficiently. In most cases, a mobile station can receive information from several cells, possibly from cells of different networks or even in different countries. The mobile station then has to choose one of the cells, and that selection requires some information e.g. about the networks to which the cells belong. This and a lot of other information is regularly sent in each cell to all mobile stations. The channel for this purpose is called the broadcast control channel (BCCH). All information needed by the mobile stations is grouped in common channels (FCCH, SCH, BCCH, PAGCH) which are downlink channels, ie. they transfer information from the network to the mobile stations. The uplink common channel on which mobile stations can send their access requests to the network is called the random access channel (RACH).

Figure 1:
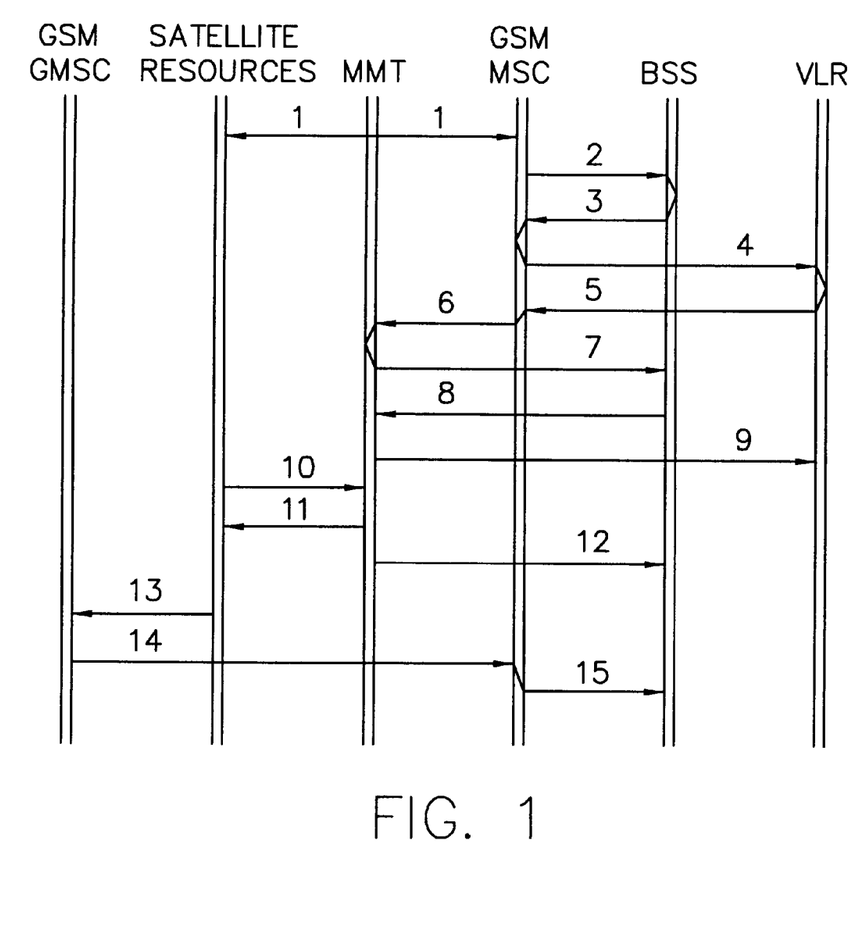
FIG. 1 is a signalling diagram of an embodiment of the handover method according to the invention.

In the dual-mode case of the present invention access to a satellite system shall be implemented as an access-handover procedure. This means that the mobile station simultaneously requests access and handover from a terrestrial network to a satellite system. Since the satellite system may have a different transmission protocol (frequency used, access methods, etc.) the mobile station, after it has been granted the channel it requested, has to be able to switch into another mode and release the terrestrial channel. Selection of the network is done with the PQ selection according to the transmission quality and service prices of the partaking operators. FIG. 1 shows an example of the access-handover procedure which can be performed both automatically and manually. Such an access-handover method is also used in the multimode case.

FIG. 1 illustrates the basic features of the PQ-selective handover between a terrestrial and satellite system, in which the dual-mode or multimode terminal decides which channel it should use. The terrestrial system in FIG. 1 is a GSM system. First, using messages 1 the terminal sends to both systems, the terrestrial and the satellite system, requests for a handover. Since there is a delay in the message switching in the satellite system, neither the terrestrial system nor the mobile terminal can wait for handover decisions of the satellite system. In the terrestrial system the handover message delay is a lot shorter than in the satellite system and, therefore, the terminal can first use a channel allocated from the terrestrial network until it gets an allocated channel from the satellite, too. In FIG. 1, MMT is the terminal, GSM/MSC is a mobile telephone exchange, BSS is a base station system, VLR is a visitor location register, and GSM/MSC is a gateway mobile services switching centre, and in addition to those, also satellite resources take part in the signalling. In the signalling, which first occurs in the terrestrial network, 2 is a message signifying a channel handover, 3 is a channel request, 4 allocates a handover number, 5 means the sending of a handover report (after which a channel request acknowledge is sent to the visitor location register VLR), 6 is a handover command, 7 represents access related to the handover, message 8 contains physical information and, finally, message 9 informs the visitor location register about the fact that the handover has been successfully completed and accepted. After a delay the terminal MMT receives a handover command 10 also from the satellite system, and message 11 indicates successful completion and acceptance of the handover. After that the terminal MMT performs comparison between the two channels it was given and after the comparison and decision the inferior of the connections is released. In this case, the GSM channel is released with message 12 containing information about the satellite channel. Message 13 to the gateway MSC indicates that the handover is completed and the satellite channel is in use. Message 14 contains information about the handover and message 15 indicates that the handover to the satellite is completed. For a moment two channels are allocated for the terminal, one from the terrestrial and one from the satellite system, but that is the price satellites must pay for the long distance. This means that if the terminal will not use the channel allocated from the satellite, the user shall not be charged for that time, even though the delay is less than one second. The handover problem in new integrated systems comprising satellite and terrestrial system can be solved by using this handover method. The handover between two terrestrial systems can also be performed in the same manner. The selection is based on the PQ selectivity. The same principle, PQ selection, can be applied to networks also in the case of access. One should bear in mind that FIG. 1 shows only the general principle and basic features of the access and handover methods based on the PQ selection. It is clear to a person skilled in the art that there are many alternative ways to implement an access and handover method according to this principle.

In the multimode case the advantages of the multimode terminal become apparent when several satellite and terrestrial networks cover the same area and offer different prices and different quality. Therefore, use of an optimally selective system based on price and quality, which enables the user of a multimode terminal to have access to various networks, may solve the problems of multi-network communications. A mobile communication system offering this kind of advantage is bound to win an unparalleled support from the users. The possibility of using connections of different networks brings along rational competition between the operators and, hence, an improvement in the service quality and prices. In the universal multimode system, access to various terrestrial or satellite-based mobile communication systems is based on the multiple access selective system (MASS).

Next we will discuss multimode and dual-mode terminals. Because of the dualism of the network or, rather, the multi-network communication environment, the user has to be able to have access to various operators by using only one mobile terminal which allows him to choose services on the basis of the PQ evaluation. A normal dual-mode terminal suffices when the user needs radio connections to a satellite system (e.g. Inmarsat-P or Ididium) or to a terrestrial network (e.g. GSM), but the answer to the needs of multi-network mobile communications including both satellite and terrestrial networks is the multimode mobile terminal (MMT). Therefore, the PQ selection is the natural solution satisfying the expectations of the multi-network user. The operation of the PQ selection may be compared to a tuner in a normal radio receiver that can be tuned to different radio stations operating at different frequencies. The PQ selection of a multimode terminal can automatically (alternately) listen to the signals of various mobile networks and change to a desired channel when moving from a cell to a satellite beam or vice versa. In other words, the PQ selection system hops from a frequency band to another, implementing a kind of frequency hopping concept, and listens to the appropriate information (prices), compares it with the transmission quality and makes the selection according to the desired level (price/quality or quality/price) as determined by the user. A multimode or dual-mode terminal provided with the PQ selection has a considerable competition advantage when compared to other dual-mode terminals. The PQ selection may also be integrated in existing mobile stations and the user can have the possibility of selecting the most advantageous calls in areas where there are two or more mobile operators available. The RF part of the multimode terminal includes a multimode modulation and demodulation system. The dual-mode terminal (DMT) according to the invention uses the multiple access selective system provided with the PQ selection, mobile price information system, mobile invoicing system, smart card management part, charging module and the subscriber identity and invoicing module and provides the user with all the methods, features and benefits that are included in the multimode terminal, but operates only between two networks.

The multiple access selective system including PQ selection provides the user of a mobile station with a unique possibility of real-time access to two or more satellite-based or terrestrial mobile networks. When idling, the mobile terminal performs the PQ selection in order to determine which of the connections provided by a terrestrial base station or a satellite beam, ie. the cells in which the terminal is located, is the most suitable. The cell selection is based on the evaluation of signal strength and quality and the competitiveness of the prices of the services offered to the terminal. Having selected the optimal channel the multimode or dual-mode terminal requests a connection from the network in question, after which the multimode or dual-mode terminal can also be registered in the network. Inter-network operation occurs in the multimode or dual-mode terminal, the operation of which is based on the PQ selection. Users of mobile terminals can choose between automatic and manual PQ selection and, thus, they can select a network on the basis of a better quality, lower price or, in some areas, both of these. The information needed in the PQ operation is provided by the multiple access selective system, which may be integrated into mobile networks or into the satellite system (MASCS) of the universal multimode system. The PQ selection is based on the fact that the prices of satellite communication services will be much higher than the prices of services provided by the cellular systems and that the prices in different satellite communication networks and in different terrestrial networks will also be different. Information about the service prices of various networks can be easily sent to mobile terminals by means of the signals (on common channels) of the networks, or alternatively only one satellite network, a multiple access satellite communication system, may provide the price information for all operators for the mobile terminals. Since communication satellites are mobile and cover areas with different price levels, the invention presents a mobile price information and invoicing system associated with the PQ selection system, so that this feature can be used to create rational competition between mobile operators. If the mobile station finds that the service prices and quality of two or more partaking networks are identical, it connects to the terrestrial network. If no terrestrial network is available or it is overloaded, the mobile station performs a random selection based on a random multiple access (RMA) system, which is an object of this invention. The PQ selection system can also be integrated in fixed terminals, e.g. telephone terminals, which then provide the possibility of selecting the optimal service provider from among several available fixed network operators. The PQ system may also be service-specific, in which case it makes the selection according to both the price-quality ratio and the service required which may not be available in all satellite or terrestrial networks.

It is clear that a system like the PQ selection can also be based on other than price and quality criteria or parameters and that it can be applied in the selection of a network, connection, service etc. in general, particularly in the case of a multimode terminal that is capable of operating in different systems. Next we will take a closer look at the implementation of such a selection function in a terminal. In addition to the network, a terminal may also choose the service it uses. The terminal may carry out many kinds of optimization. It is preferable to have the optimization automated when the user or application just gives the parameter or parameters to be optimized. If the user e.g. wants to use a duplex 9.6 kbps data transfer, the terminal may always use a network that offers this service at the lowest price. For example, the terminal may in the user's own office room use a wireless local area network (W-LAN) and in the other office rooms a DECT network and upon leaving the DECT service area it may switch to the GSM or DCS 1800 network. Parameters to be optimized may include, in addition to the price and quality, the power required, data transfer rate of the connection: either a suitable rate or the fastest rate available, service availability and the need to use a different service. For the application, the optimization may be a lower-level service.

The optimization may be implemented so that the user selects the service to be requested and the parameters to be optimized. In the case of a smart terminal, applications may have these parameters and the application can require the radio unit to optimize the service. After that, the terminal automatically selects the best network and service according to these parameters. While moving, or perhaps for some other reason, the terminal optimizes the selected service continuously.

Figure 2:
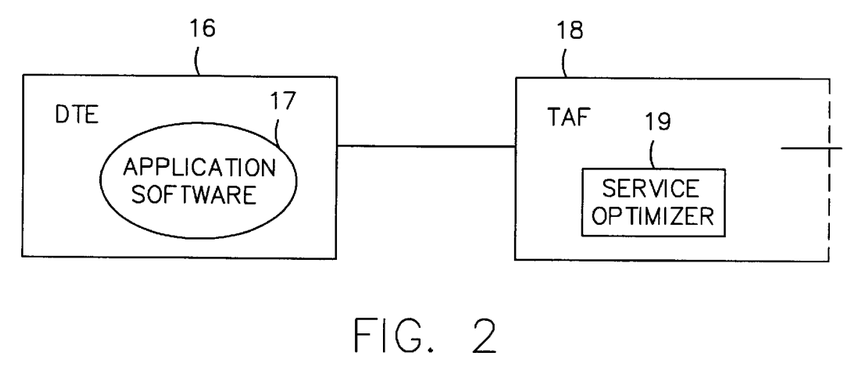
FIG. 2 is a simplified block diagram of a mobile terminal according to the invention.

The implementation of such a selection or optimization may simply comprise means that indicate which service is considered best. The device decides that according to the application used by the user, or according to factors defined by the user (or application). FIG. 2 shows an example of the implementation in which the terminal 16 is a data terminal equipment (DTE) including at least some application software 17. In the case of data terminal equipment said means can only monitor the data traffic and decide what kind of service is best for that data traffic. The means can then request the radio unit to start using a suitable service. The service may be provided by the same network that the terminal is using currently, or the terminal may switch to another network if it is capable of operating in several networks. The means that perform the selection or optimization may comprise one function among the terminal adaptation functions. The terminal adaptation functions (TAF) are represented by reference number 18 and the means performing the selection or optimization by reference number 19. The terminal may carry out the optimization e.g. on the basis of the following criteria:

1) Data rate required by certain applications or during certain sessions. The user may first want to transfer files and then read the e-mail. The terminal selects the most suitable network service for the applications the user is running.
2) Price of the connection. The user may want to minimize the price of the connection. This can mean that the terminal selects a low-speed service instead of a high-speed service even if high data rates were needed.
3) Speed of the connection. In this case the user needs the fastest connection available regardless of the price.
4) What services are available in the area. If all services that the terminal is able to use are not available in the area, the terminal may select the best of the services available.

The user may select the optimization criteria with the help of the application, or the application may select them automatically. This naturally requires special application software 17, which can exchange the necessary information with the terminal adaptation functions 18. However, the terminal adaptation functions may carry out the optimization without any interaction with the application. This is possible at least in the cases 1) and 4) above.

Such means are needed e.g. to enhance GSM and PCS data cards when high-speed data services and packet data services become available parallel to the old services. Such means provide the user of a terminal with the advantage that he does not have to select with settings which service or network he wants to be used, and the cost of the service is minimized at the same time as the efficiency of network use is improved. If the pricing information of the network is available to the terminal, the terminal may use it as input information for the optimization.

The following is an example of the operation of a multimode terminal which is capable of operating in two wireless networks and one wireless local area network. In addition, it is assumed that the user is on the move and working with his personal digital assistant (PDA). The user switches his terminal on when he is in a train, on his way to the office, and starts working. The terminal scans for wireless networks available and finds only network A. Network A provides both circuit switched and packet switched data services. The user wants to log on to the company's local area network (LAN) and download the latest sales report from the office. Since the amount of data is high, the terminal uses a 64 kbit/s circuit switched connection. After the data has been received and the user is reading the report, and no data is being transferred, the terminal switches to the packet data service. The user pays only when he transfers data. Note that the connection is not disconnected. Having stopped reading the user wants to check his e-mail and the PDA terminal will transfer data in the packet data mode.

Then the train enters a metropolitan area where also a wireless network B is available. The terminal is continuously scanning for available networks and notices network B. Network B is quite similar to network A but offers packet data service at a much lower price than network A. So the terminal switches to network B since it is using packet data service. When the train leaves the metropolitan area, network B is no longer available and the terminal has to switch back to network A. When the user arrives in the office the terminal notices the presence of the local area network (LAN) and naturally starts using it.

If the user had had a file transfer going on, the terminal would have used network A all the time, because a file transfer requires high data rates and the packet data network only slows down the file transfer in addition to being a more expensive solution. The example gives some idea of the meaning of optimization. The terminal had a data link all the time but it used different networks and services when they were available. If the 64 kbit/s circuit switched service had been used all the time, the cost of the service would have been very high. Furthermore, an enormous amount of the capacity of network A would also have been misused.

Next it will be given a further example of how a terminal can acquire knowledge about services available in different networks. The example is based on the GSM standard and enhancements, but the optimization according to the present invention can be utilized in all wireless communication systems. It is naturally essential for the terminal to know what services are available in the various networks. In planned GSM enhancements concerning high-speed circuit and packet switched data services the network broadcasts information about the available enhanced services on common control channels. The terminal is able to receive this information and use it as an input to the optimization means. That actually means that the terminal is able to receive a directory of services and pick up a suitable service. However, the GSM currently does not provide that kind of service, but the terminal has to try to use the service in order to know if it is available or not.

If the data terminal equipment and radio unit are separate devices, as they are e.g. in Nokia Mobile Phones' present data concept, they have to be able to communicate with each other. In said data concept the PCMCIA card and the mobile phone are capable of exchanging information over a bus (Nokia Bus). In the future, the service directory could be sent to the PCMCIA card simply over that bus.

The PQ selection based handover can be applied also when changing connections from a terrestrial network to another, e.g. from the GSM system to the personal communication system (PCS) or the digital European cordless telecommunication (DECT) system. The selection may be done both when the mobile terminal is in idle mode or when it is operating on an established connection.

Since those networks participating in the universal multimode system that have radio coverage in the same area share the same users because of the PQ selection, they also share their capacity between all available users. Therefore, the total capacity of the network may be increased by adjusting and enhancing the service prices and transmission quality. This means that a full load can be placed on the capacity of such a network during busy traffic hours. Therefore, when new mobile terminals try to access such a network, call congestion will not be a problem anymore since the multiple access selective system routes all new mobile terminals to other networks available. The universal multimode system forms a transparent integrated network at the radio interface level of the various networks, whereby several networks may share the same subscribers, which increases the number of their customers without fear of congestion. This means a capacity increase, which is cost-effective from the point of view of the operators and brings new efficiency in the use of capacity in mobile communications.

Next we will consider the question whether users, if they for various reasons (travelling, lower prices, better services, etc.) need access to various networks, have to buy or lease different terminals or to make a contract with the various operators to satisfy these needs. On the other hand, the mobile operators from time to time have to adjust their prices according to their services and compete with other operators to win new customers. It is difficult to attract customers that already have a contract with another operator. PQ selection and the use of the smart card management part (SCMP) and the mobile price information and invoicing systems can solve this problem. Both the mobile price information system and mobile invoicing system are new pricing and invoicing solutions for advanced telecommunications, and also objects of this invention. They ensure that the most suitable and competitive system will be used. In addition, the mobile pricing system and invoicing system can be applied in fixed networks as well.

Next we will discuss the mobile pricing system (MPS). It is a dynamic and advanced system which increases competition between operators in a rational way since it provides each operator with the possibility of gaining a competition advantage by adjusting the relative prices of their services according to the place or time. Place, time and mobility are key factors in the mobile pricing procedure. Operators may change their prices according to the capacity in certain areas, e.g. in metropolitan areas or suburbs. A satellite beam covering gaps in a cellular network may offer services at a higher price than another one which provides extra coverage. The mobile pricing procedure may vary from cell to cell, beam to beam, area to area and, finally, from network to network. Since the users, too, are mobile, they must have a chance to use different service providers with different price levels. And since the satellites are also mobile, the mobile pricing procedure is necessary and, therefore, the use of the mobile pricing system is an essential solution that supports free and rationalized competition in future mobile communications. Satellite operators can best benefit from the advantages of the mobile pricing system and enjoy a-broad market when they build their systems and services for the users of mobile stations faster. Applying different price levels for the services in the same or different areas increases the returns of both the satellite and the terrestrial operators in a rational way and gets the users' support. Furthermore, offering lower prices for satellite services in areas already covered by terrestrial networks entices customers of cellular networks into using satellite services as well, which makes the use of the mobile pricing system necessary. Since the transmission quality of satellite communications is, due to delays and long distances, poorer than that of terrestrial systems, the mobile pricing system may provide satellite operators with the chance to offer their services at dynamic prices during the busy hours of terrestrial networks and, thus, a chance to share customers with terrestrial operators. However, all this is possible only by applying the mobile pricing system which together with the PQ selection provides a rational and reasonable pricing system and user-friendly services and which can also remove many unavoidable obstacles by means of integrating satellite and terrestrial systems.

Figure 3:
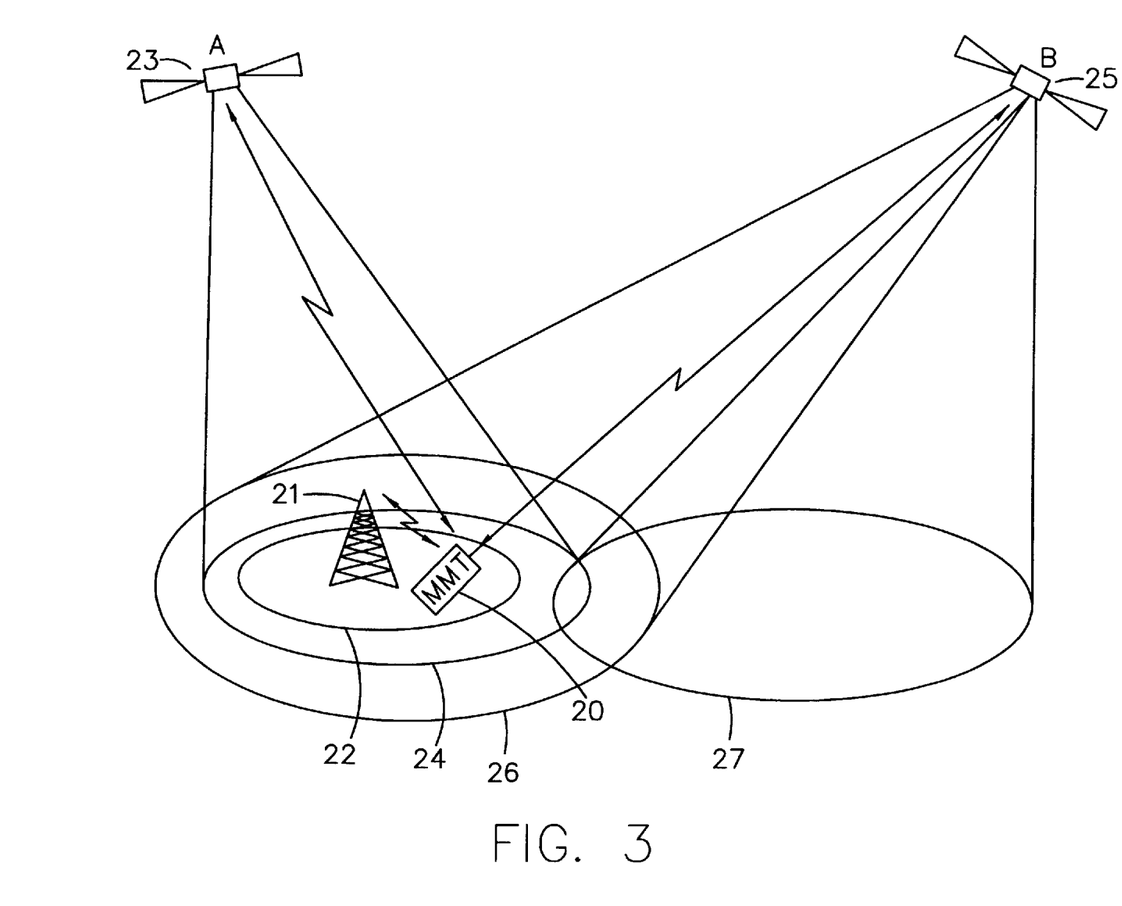
FIG. 3 illustrates an example of the operation of the mobile pricing system according to the invention.

Below, with reference to FIG. 3, it is given an example of the operation of the mobile pricing system with one cellular operator and two satellite operators transmitting their service price information through their signalling channels to a mobile terminal. The multimode terminal 20 in FIG. 3 can communicate with the base station 21 of the cellular system, satellite A, or satellite B. The base station 21 constitutes a cell 22 in the cellular system, satellite A has a beam 24 covering said cell, and satellite B has a beam 26 covering both the above, and another beam 27 which partly overlaps the beams 24 and 26. Let us assume that the service prices in each network are as follows:

cellular system: $ 1/min., good transmission quality,
satellite system A: $ 2/min., average transmission quality,
satellite system B, beam 26: $ 0.5/min., average transmission quality,
satellite system B, beam 27: $ 1.5/min., average transmission quality.

Depending on the level (price/quality) required by the user, the mobile terminal, after an evaluation and calculation of the information received, selects the optimal network, e.g. satellite system B, because the price is reasonable and the transmission quality acceptable. But if the user wants to have a better quality, he should use another criterion (quality/price). When the mobile terminal wants to switch to the beam 27 of the satellite system B, it performs a handover to this new area with higher service prices since there is no alternative network. All processing is done by the PQ selection system in the mobile terminal according to information received from the mobile pricing system, the latter being integrated to the participating satellite or terrestrial networks or alternatively to the multiple access satellite system only.

The mobile pricing system may also transfer information e.g. about the capacity available, and then we are talking about a PCQ selection system, ie. a system that selects a connection on the basis of the price, capacity and quality. It is clear that a PQ or PCQ system like the one described here may also be implemented in any existing system, say, in the GSM system. Then the price and capacity information could simply be added in the broadcast information transmitted continuously to the terminals by base stations, and the terminals would receive this information without an access procedure even in the case of an already overloaded network. The PCQ selection could be implemented in the GSM without any dramatic changes in the system configuration, since there already exists in the GSM system a channel selection procedure based on questions and answers between the terminal and base stations and on channel allocation on the basis of connection quality, among other things. By adding software and signalling information, the selection could be based on the evaluation of the price, capacity and quality, or only the price, for example.

The universal multimode system includes a price information controller (PIC) which is integrated in each satellite or cellular system in order to send price information on their common signalling channels. Alternatively, the price information controller may be integrated in one satellite system as a price information database of satellite and terrestrial operators, sending the required information at all times to all mobile station users. In that case, the price information controller serves the users just like a stock exchange serves its customers by receiving, controlling and updating the prices of operator services continuously and by sending these to the mobile station users.

Next we will discuss the mobile invoicing system (MIS) including the smart card management part (SCMP) in the mobile terminal, which debits the call charges directly from the user's smart card or transfers them from the credit card account to the operator's account during the call and, when required, displays a report about the transfer on the mobile terminal's display. For users who do not have an international credit card, banks or consortia of satellite and terrestrial operators, for example, may develop a kind of tele credit card, which here is called a call charging module (CCM). Another alternative is the subscriber identity and invoicing module (SIIM) which can be used both as a call charging module and as an ordinary subscriber identity module (SIM). The invoices may be sent to the mobile terminal to remind the users of paying them in time, or otherwise the user will be disconnected from the network after a specified time limit. A consortium of operators may open an international or local account to which the users can pay their bills. On the other hand, the transfer of invoicing information further from a satellite system to a terrestrial system and vice versa or from a terrestrial to another terrestrial system can be implemented after the call has ended. In this case the call tariffs and charges comply to the dynamic accounting system (DAS) where the operator-specific call charges and user-specific charges are calculated on the basis of real-time values obtained from the currency market, and the user's smart card is debited accordingly, or the charges are further transferred directly either to the user or to the operators, depending on the arrangements agreed upon when drawing up new international agreements between operators. A dynamic pricing procedure is rational and necessary to international mobile operators because of sudden changes in the values of different currencies. Otherwise, the charge compensation between the operators may be performed as in the existing procedures in cellular systems, upon which the operators, e.g. GSM operators, can agree. The mobile invoicing system also includes an invoice information controller (IIC) which arranges the customer-specific invoices and debits the users' smart cards etc. and controls the tariffs. The invoice information controller is preferably integrated in the dynamic accounting system.

Next we will have a look at the multiple access satellite communication system (MASCS). The multiple access satellite communication system provides satellite communication services and mobile pricing and invoicing services for dual-mode and multimode terminals. This system may also be integrated in available or future satellite communication systems that support services provided by the mobile pricing system and invoicing system and other solutions described in connection with the present invention. The multiple access satellite communication system may alternatively function as an interconnecting system for all satellite systems. In that case the only requirement for a dual-mode or multimode terminal is that it is connected to a terrestrial network and to a multiple access satellite communication system. The latter receives all price and other required information from other satellite systems, or it may give those to the terminal itself. Then the terminal compares the received information with information obtained from the terrestrial network and selects the optimal network using the PQ selection. If the selected network is a satellite system the terminal informs the multiple access satellite communication system about the selection. This, in turn, requests an access to a third satellite system chosen by the terminal, after which, if access was successful, communication between the terminal and the third satellite system occurs via the multiple access satellite communication system. In this alternative, the multiple access satellite communication system charges the third satellite system for transit services only. The satellites of the multiple access satellite communication system are positioned in the case of a separate satellite system so that it is possible to support the efficient providing of communication services to the users of the system.

Universal systems are expected to comply with local regulations and, what is more important, to share the returns from the traffic with local operators in the countries in which the calls originate or terminate. Therefore, access must be precisely controlled and be in accordance with all appropriate national regulations. In the universal multimode system, this is ensured by the calls local controller (CLC).

The calls local controller located in each country and connected to the fixed network (PSTN, ISDN) serves as a representative of and gateway to the multiple access satellite system, operating as an agency for said satellite system, facilitating the sharing of made returns with the local operators, which will be carried out in a way complying with the local regulations. The calls local controller is a transceiver in parallel with the transceiver of the satellite system. Simultaneously with the satellite system it receives the request and acknowledge messages switched between a dual-mode or multimode terminal and the satellite systems, as well as the information about the duration of each call. The calls local controller may prevent access by a mobile terminal to the satellite systems, or any call terminating in a terminal by sending a "stop access" command to the satellite operator, or alternatively the connection between the mobile terminal and the multiple access satellite system may be implemented through the calls local controller. Each calls local controller is responsible for only those traffic areas which are located in that country. Traffic areas are determined by all the satellite cells that cover the areas of that country and in which the mobile terminal is located or is moving. Since satellite cells are continuously moving, their location is made fixed by means of a backward relay system, which will be discussed later. In addition, the calls local controller is provided with a home location register (HLR) which includes information about all subscribers who live in the country in which the calls local controller is located, so that satellite systems are forced to request the calls local controller for information about the identity of its subscribers for each originating or terminating call. The calls local controller is also provided with a visitor location register (VLR) for those mobile terminals that visit the area controlled by the calls local controller.

Next we will discuss the so-called backward relay system. Since a satellite beam which includes several cells is continuously moving, a backward relay system is needed which changes channels between cells and beams. The backward relay system switches the channels of each cell to the respective trailing cell when the geographical areas (footprints) covered by the cell change as the satellite moves. In the backward relay system, each cell and beam is considered as trailing the respective leading cell or beam. The co-operation of a leading and the trailing beam in the backward relay system, i.e. changing of channels, is performed by taking into account in the calculation the speed of rotation of the satellites and the Earth and the nutation movement, thus producing virtually fixed cells (VFC). A virtually fixed cell is a new concept as regards satellite cells, and it may be compared with the cells of a cellular system which are geographically fixed all the time, and they make possible local control which is of crucial importance to each country. The backward relay system may be integrated in each satellite to switch the channels of a beam group and their cells backward to other cells. Therefore, calls originating or terminating at a terminal can be easily located and routed, and the calls local controller can control them.

Next it will be discussed some alternatives for the location registering and the processing of calls terminated in a mobile station. As regards calls terminated in mobile stations, the universal multimode system is in close co-operation between a satellite system (e.g. Inmarsat-P) or its own satellite system, the multiple access satellite communication system, in which the international subscriber numbers of the mobile terminals of the universal multiple access system are registered in its home location register. A mobile terminal in the idle or active mode listens to the broadcast channels of this satellite system and continuously sends its location information to it. The satellite system in question includes a gateway exchange (G-MSC) which in the case of the multiple access satellite communication system is a calls local controller (CLC) connected to public networks, such as an ordinary PSTN network or ISDN network. Calls terminating at a mobile station are routed via this gateway to the satellite system and from there to mobile terminals. In this alternative the satellite operator in question benefits from the payments of all incoming calls, but calls originating at mobile stations do not necessarily travel through this operator because of the PQ selection.

In a second alternative, a mobile terminal listens alternately to the common channels of each available network and on the basis of the PQ selection chooses the optimal network for the connections. Having accessed the network the mobile terminal sends the required location information to the network and the information is then routed to the visitor location register (VLR) of the network. Therefore, only one network, namely that in whose visitor location register the location information of the mobile terminal is temporarily registered, answers calls terminating at the mobile station. After that, the mobile terminal may change networks as it moves, but the call is in any case continued from cell to cell or from network to network by means of the access and handover based on the PQ selection. When the mobile terminal switches to another network, its location information in the visitor location register of the previous network is removed.

It should be noted that the solutions, namely, the methods, hardware arrangements and terminal arrangements, related to the universal multimode system according to the invention, are not limited to any particular terrestrial or satellite-based mobile networks, but they can just as well be applied in all mobile communication systems where these solutions are needed. Above it has been described preferred embodiments of the invention, but a person skilled in the art can see that there are also other alternatives for the implementation of the invention which are all within the scope of the invention defined by the claims attached hereto.

What is claimed is:

1. Mobile communication entity providing communication between a mobile terminal and plural mobile communication networks, which communication networks are parts of different mobile communication systems (31, 32, 33, 34, 44), wherein said mobile terminal (42, 43) includes control-channel communication means for receiving data from and for transmitting requests to individual ones of said networks via downlink and uplink control channels, said data including services provided by respective ones of said networks, and wherein said mobile terminal is located relative to said networks for concurrent capability of communication with a plurality of said networks, said mobile terminal having means for indicating a selection of a first connection with a first mobile communication network and a first service offered by the first mobile communication network, the selection being based on a certain criterion or criteria, wherein said mobile terminal (42, 43) is operative to provide a selection of a second mobile communication network and a second service offered by the second mobile communication network, and is operative to maintain open communication channels concurrently with said first and said second mobile communication networks during said selection, said mobile terminal (42, 43) is operative further to establish a second connection with the second mobile communication network when a certain criterion or criteria is met, and the mobile terminal (42, 43) is operative to disconnect said first connection after said second connection has been established; and wherein said mobile terminal comprises at least one data application that directs said mobile terminal to select one of said communication networks and a service offered by a selected one of the communication networks, and wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, said criterion or criteria being based on said parameters.

2. Mobile communication entity according to claim 1, further comprising means for delivering information about said first and second mobile communication networks and services centralized to the mobile terminals (42, 43) connected to said first and second mobile communication networks.

3. Mobile communication entity according to claim 2, wherein said information delivering means comprises a pricing system, which has been arranged to receive price information from said first and second mobile communication networks to be further delivered to said mobile terminals (42, 43).

4. Mobile communication entity according to claim 1, wherein said mobile communication networks comprise means for offering circuit switched and packet switched data services, and said data application selects the data service between the switched data service and the packet data service based an said criterion or criteria.

5. Mobile communication entity according to claim 4, wherein, during a transfer between said switched data service and packet data service, the connection remains unbroken.

6. Mobile communication entity according to claim 1, further comprising a mobile communication network based on satellites, wherein said satellite based mobile communication network is operative to direct seemingly fixed coverage areas, including cells in terrestrial mobile communication networks, to the earth, said coverage areas comprise a first coverage area and a second coverage area, and said satellite based mobile communication network is operative to transfer a radio communication from said first coverage area to said second coverage area in relation to the movement of the satellites.

7. Mobile communication entity providing communication between a mobile terminal and plural mobile communication networks, which communication networks are parts of different mobile communication systems (31, 32, 33, 34, 44), wherein said mobile terminal (42, 43) includes control-channel communication means for receiving data from and for transmitting requests to individual ones of said networks via downlink and uplink control channels, said data including services provided by respective ones of said networks, and wherein said mobile terminal is located relative to said networks for concurrent capability of communication with a plurality of said networks, said mobile terminal is operative to indicate a first message and a sender of the first message, and is operative to establish a first connection from the sender to the mobile terminal (42, 43), wherein the mobile terminal (42, 43) is operative to indicate a second message and a sender of the second message, and is operative to establish a second connection from the sender of the second message if the sender of the second message is the same as the sender of said first message, said mobile terminal being operative to maintain open communication channels concurrently with the sender of said first message and the sender of said second message, and subsequently to disconnect said first connection; and wherein said mobile terminal comprises at least one data application that directs said mobile terminal to select one of said communication networks and a service offered by a selected one of the communication networks, wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, and wherein criterion or criteria for a selection by the mobile terminal is based on said parameters.

8. Mobile communication entity according to claim 7, further comprising means for delivering information about said mobile communication networks centralized to said mobile terminals (42, 43).

9. Mobile communication entity according to claim 8, wherein said information delivering means comprise a pricing system, which has been arranged to receive price information from said mobile communication networks to be further delivered to said mobile terminals (42, 43).

10. Mobile communication entity according to claim 7, wherein said mobile communication networks comprise means for offering circuit switched and packet switched data services, and said data application selects the data service between the switched data service and the packet data service based on said criterion or criteria.

11. Mobile communication entity according to claim 10, wherein, during a transfer between said switched data service and packet data service, the connection remains unbroken.

12. Mobile communication entity according to claim 7, further comprising a mobile communication network based on satellites, wherein said satellite based mobile communication network has seemingly fixed coverage areas including cells in terrestrial mobile communication networks, and is operative to direct the seemingly fixed coverage areas, including the cells in terrestrial mobile communication networks, to the earth, said coverage areas comprise a first coverage area and a second coverage area, said satellite based mobile communication network is operative to transfer a radio communication from said first coverage area to said second coverage area in relation to the movement of the satellites for offering a terrestrial mobile communication service.

13. Mobile terminal (42, 43), which is operative to establish connections to a receiver via any one of a plurality of mobile communication networks, wherein said mobile terminal (42, 43) includes control-channel communication means for receiving data from and for transmitting requests to individual ones of said networks via downlink and uplink control channels, said data including services provided by respective ones of said networks, and wherein said mobile terminal is located relative to said networks for concurrent capability of communication with a plurality of said networks, said mobile terminal having means for indicating a selection of a first connection with a first mobile communication network and a service offered by the first mobile communication network, the selection being based on a certain criterion or criteria, wherein the mobile terminal is operative to select a second mobile communication network and a second service offered by the second mobile communication network, said mobile terminal (42, 43) is operative to establish a second connection to said receiver using a second mobile communication network when a certain criterion or criteria is met, and the mobile terminal (42, 43) is operative to disconnect said first connection after said second connection has been established; and wherein said mobile terminal comprises at least one data application that directs said mobile terminal to select one of said communication networks and a service offered by a selected one of the communication networks, and wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, said criterion or criteria being based on said parameters.

14. Mobile terminal (42, 43), which is operative to receive messages from a sender via any one of a plurality of mobile communication networks, wherein said mobile terminal (42, 43) includes control-channel communication means for receiving data from and for transmitting requests to individual ones of said networks via downlink and uplink control channels, said data including services provided by respective ones of said networks, and wherein said mobile terminal is located relative to said networks for concurrent capability of communication with a plurality of said networks, said mobile terminal having means for indicating a selection of a first message and a sender of the first message, the mobile terminal being operative to establish a first connection from the sender to the mobile terminal (42, 43), wherein the mobile terminal (42, 43) is operative to indicate a second message and a sender of the second message, to establish a second connection from the sender of the second message if the sender of the second message is the same as the sender of said first message, and to disconnect said first connection; and wherein said mobile terminal comprises at least one data application that directs said mobile terminal to select one of said communication networks and a service offered by a selected one of the communication networks, wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, and wherein criterion or criteria for a selection by the mobile terminal is based on said parameters.

15. A method of establishing a connection from a mobile terminal (42, 43) to a receiver in a mobile communication entity, which entity interconnects a plurality of mobile communication networks, which communication networks are parts of different mobile communication systems (31, 32, 33, 34, 44), wherein said mobile terminal (42, 43) includes control-channel communication means for receiving data from and for transmitting requests to individual ones of said networks via downlink and uplink control channels, said data including services provided by respective ones of said networks, and wherein said mobile terminal is located relative to said networks for concurrent capability of communication with a plurality of said networks;

wherein said mobile terminal comprises at least one data application that directs said mobile terminal to select one of said communication networks and a service offered by a selected one of the communication networks, and wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, the method comprising steps of:

said mobile terminal (42, 43) selects a first mobile communication network and a first service offered by the first mobile communication network based on a certain criterion or criteria that includes said parameters, said first mobile communication network being one of a plurality of said networks available for communication with said mobile terminal, said mobile terminal establishes a first connection to said receiver using the first mobile communication network, said mobile terminal (42, 43) selects a second mobile communication network and a second service offered by the second mobile communication network, said second mobile communication network being one of a plurality of said networks available for communication with said mobile terminal, said mobile terminal (42, 43) establishes a second connection to said receiver using the second mobile communication network when a certain criterion or criteria based on said parameters is met, and said mobile terminal (42, 43) disconnects said first connection after said second connection has been established.

16. A method of establishing a connection from a subscriber to a mobile terminal (42, 43) in a communication entity, which entity interconnects a plurality of mobile communication networks, which communication networks are parts of different mobile communication systems (31, 32, 33, 34, 44), wherein said mobile terminal (42, 43) includes control-channel communication means for receiving data from and for transmitting requests to individual ones of said networks via downlink and uplink control channels, and wherein said mobile terminal is located relative to said networks for concurrent capability of communication with a plurality of said networks;

wherein said mobile terminal comprises at least one data application that directs said mobile terminal to select one of said communication networks and a service offered by a selected one of the communication networks, and wherein an individual one of said communication networks offers at least one of a plurality of services from a set of services including circuit switched data service and a packet switched data service subject to a plurality of parameters from a set of parameters including quality of a transmission channel, capacity of a transmission channel, service availability, data transfer speed, amount of data to be transferred, and service price, the method comprising steps of:

selecting, by said mobile station, one of said communication networks and a service for communication with said mobile terminal based on a criterion or criteria that includes said parameters, indicating a first message and the sender of the first message, establishing a first connection from the sender to the mobile terminal (42, 43), indicating a second message and the sender of the second message, establishing a second connection from the sender of the second message if the sender of the second message is the same as the sender of said first message, and disconnecting said first connection.

* * * * *